(12) United States Patent
Chang et al.

(10) Patent No.: US 8,121,877 B2
(45) Date of Patent: Feb. 21, 2012

(54) DYNAMIC EVOLUTION OF BUSINESS PERFORMANCE MANAGEMENT SOLUTIONS USING DECLARATIVE EVOLUTION POLICIES

(75) Inventors: Hung-Yang Chang, Scarsdale, NY (US); Hui Lei, Scarsdale, NY (US); Chang Shu, Beijing (CN); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 11/779,320

(22) Filed: Jul. 18, 2007

(65) Prior Publication Data

US 2009/0024426 A1    Jan. 22, 2009

(51) Int. Cl.
*G06Q 10/00* (2006.01)
(52) U.S. Cl. .................................. 705/7.11
(58) Field of Classification Search .................. 705/7.11
See application file for complete search history.

(56) References Cited

U.S. PATENT DOCUMENTS

| | | | | |
|---|---|---|---|---|
| 6,334,215 | B1 * | 12/2001 | Barker et al. | 717/167 |
| 6,381,619 | B1 * | 4/2002 | Borowsky et al. | 711/170 |
| 6,556,961 | B1 * | 4/2003 | Lafe | 703/2 |
| 6,934,755 | B1 * | 8/2005 | Saulpaugh et al. | 709/226 |
| 7,406,424 | B2 * | 7/2008 | Cheeniyil et al. | 705/301 |
| 7,418,453 | B2 * | 8/2008 | Chowdhary et al. | 1/1 |
| 7,509,308 | B2 * | 3/2009 | Huang et al. | 1/1 |
| 7,546,601 | B2 * | 6/2009 | Byrd et al. | 718/104 |
| 7,583,590 | B2 * | 9/2009 | Sivakumar et al. | 370/217 |
| 2002/0087062 | A1 * | 7/2002 | Schmidt et al. | 600/407 |
| 2003/0078957 | A1 * | 4/2003 | Cheeniyil et al. | 709/201 |
| 2005/0086457 | A1 * | 4/2005 | Hohman | 713/1 |
| 2005/0116361 | A1 * | 6/2005 | Fukui | 257/903 |
| 2005/0125522 | A1 * | 6/2005 | DelGaudio et al. | 709/223 |
| 2005/0262105 | A1 * | 11/2005 | DelGaudio et al. | 707/10 |
| 2006/0053039 | A1 * | 3/2006 | Gamarnik et al. | 705/7 |
| 2006/0111921 | A1 * | 5/2006 | Chang et al. | 705/1 |
| 2007/0033570 | A1 * | 2/2007 | Kong | 717/104 |
| 2007/0185746 | A1 * | 8/2007 | Chieu et al. | 705/7 |
| 2007/0234277 | A1 * | 10/2007 | Lei et al. | 717/104 |

(Continued)

FOREIGN PATENT DOCUMENTS

DE    10003015 A1 *  8/2000

(Continued)

OTHER PUBLICATIONS

Linagzhao, Zeng et al., Dynamic Evolution of Business Process Management IEEE International Conference on e-Business Engineering, ICEBE'06.*

(Continued)

*Primary Examiner* — Scott L Jarrett
(74) *Attorney, Agent, or Firm* — Whitham, Curtis, Christofferson & Cook, P.C.; Daniel P. Morris

(57) ABSTRACT

A policy-driven approach to Business Performance Management (BPM) evolution is to capture the mechanism of BPM solution evolutions. These policies are executed by the runtime infrastructure which transforms and interprets evolution policies and allows fine granularity controls on solution evolution. At transformation time, the relationship among the event processing progress and the runtime state is derived based on the observation model. Such relationship information allows verification of freshness of migrating data and parallelization of runtime state validation and event processing. Consistent and efficient evolution of BPM solutions transit while event processing is operational.

10 Claims, 13 Drawing Sheets

U.S. PATENT DOCUMENTS

2008/0071595 A1 * 3/2008 Chang et al. .................. 705/7

FOREIGN PATENT DOCUMENTS

| DE | EP1770915 A1 | * | 9/2005 |
| GB | EP1293924 A2 | * | 3/2003 |
| JP | 08329025 A | * | 12/1996 |
| WO | WO 2005/001726 A1 | * | 12/2005 |
| WO | WO 2007072501 A2 | * | 6/2007 |

OTHER PUBLICATIONS

Koyanagi, Teru et al., Dynamic Policy Management on Business Performance Management Architecture ICSOC 2005.*

Laingzhao, Zeng et al., Policy-Drive Exception Management for Composity Web Services Proceedings of the 7th IEEE International Conference on E-COmmerce Technology, CEC'05.*

Jeng, Jun-Jang et al., Policy Drived Business Performance Management IFIP International Federation for Information Processing 2004.*

Chen, Shyh-Kwei et al., A Model Driven XML Transformation Framework for Business Performance Management Proceedings of the 2005 IEEE International Conference on e-Business Engineering, ICEBE'05.*

Thyagarajan, V. et al.., BPR—A Tool for Managing the Change J. Hum. Ecol. vol. 15, No. 1, 2004.*

Joeris, Gregor et al., Managing Evolving Workflow Specifications $3^{rd}$ IFCIS Internal Conference on Cooperative Information Systems, 1998.*

Heller, Markus et al., A Management System for Evolving Development Processes Integrated Design and Process Technology, 2003.*

Ellis, Clarence et al., Dynamic Change within Workflow Systems ACM, COCS'95, 1995.*

Good, Declan, Legacy Transformation Technology Research Club, Aug. 2002.*

Zeng, Liangzaho et al., Model-Driven Business Peformance Management IEEE, ICEBE'05, 2005.*

Zeng, Liangzhao et al., Model-Drive Business Performance Management Proceedings of the 2005 IEE International Conference on e-Business Engineering, ICEBE'05, 2005.*

Jeng, Jun-Jang et al., BPSM: An adaptive Plaftorm for Managing Business Process Solutions Fifth International Conference on Electronic Commerce Research (ICECR-5), Oct. 23-27, 2002, Montreal, Canada.*

* cited by examiner

Dimensions
| | |
|---|---|
| dimensionID | bigint |
| dimensionOrder | integer |
| sequenceID | integer |

Values
| | |
|---|---|
| instanceID | bigint |
| attributeTypeID | bigint |
| attributeName | varchar |
| dimensionID | bigint |
| stringValue | varchar |
| doubleValue | double |

Types
| | |
|---|---|
| typeID | integer |
| typeName | varchar |

ContextInstances
| | |
|---|---|
| cTypeID | bigint |
| instanceID | bigint |
| pinstanceID | bigint |
| versionID | bigint |

Algorithm 1: updateElements(Event e)

Data:
*MapSet maps:* a set that all the map expression in observation model
*Event e:* an event in observation model
Result:
*update ElementSet:* a set that contains all the metrics or situation that may be updated during processing event e

```
1  begin
2     updateElementSet ← φ
3     inputElementSet ← {e}
4     processedElementSet ← φ
5     while inputElementSet is not empty do
6        get and remove an element from inputElementSet
7        processedElementSet += element
8        if element is an Event then
9           for map ? maps do
10             if event is trigger input of map then
11                process (updateElementSet,inputElementSet,map,output)
12       else if element is a Metric then
13          for map ? maps do
14             if value change of the metric is trigger input of map then
15                process (updateElementSet,inputElementSet,map,output)
16       else if element is a Situation then
17          for map ? maps do
18             if situation is trigger input of map then
19                process (updateElementSet,inputElementSet,map,output)
20    Procedure process(Set updateElementSet,Set inputElements,Element mapOutput) {
21       updateElementSet+={mapOutput}
22       if mapOutput is not in processdElementSet then
23          inputElementSet += {mapOutput}
24    }
25 end
```

DYNAMIC EVOLUTION OF BUSINESS PERFORMANCE MANAGEMENT SOLUTIONS USING DECLARATIVE EVOLUTION POLICIES

BACKGROUND OF THE INVENTION

1. Field of the Invention

The present application generally relates to the effective and efficient transitioning of a business model from one phase to the next phase and, more particularly, to a policy-driven approach which specifies how to phase out of an existing business process phase and how to migrate to the newer or next business process phase without loss of critical data or metrics.

2. Background Description

In order to function effectively in today's business environment, organizations must have visibility in their business activities and operation performance at all times. This allows them to stay competitive and profitable. Business Performance Management (BPM) is a new generation of enterprise data management that focuses on monitoring business operations. BPM solutions must be able to efficiently process business events, compute business metrics, detect business situations, and provide the real-time visibility of Key Performance Indicators (KPIs). A BPM solution lifecycle involves five steps, as illustrated in FIG. 1:

1. A BPM solution lifecycle starts with modeling BPM solution. We define an observation model to be an abstraction of an observation system, which captures the requirements of BPM solutions. In an observation model, a collection of metrics is defined to measure the performance of business operations, where the computation of metrics is declaratively defined.
2. In the deployment phase, after performing a series of transformations and processing with an observation model, the executable code is generated and then deployed into the runtime platform.
3. Once the BPM runtime component is deployed, it monitors business activities by measuring metrics and detecting business situations.
4. In the next phase, the monitoring results are used to perform further analysis, for example, what-if or root-cause analysis.
5. The final phase is taking action for improving the business performance. The action may include change business processes and the like.

The goal of each lifecycle is to improve the business performance, and by continuing lifecycle, the business performance is continually improved. In particular, when business performance improvement action is taken, one lifecycle is completed and another lifecycle is started. In the new lifecycle, a new observation model needs to be developed. When the new BPM solution is deployed, the evolution from the existing BPM solution to the newer one is required.

A naive evolution mechanism is "hot swap", i.e., when the new solution is deployed, the existing solution is forced to shutdown. Such an approach is easy to implement; however, it is not sufficient for supporting continual BPM lifecycles. First, the hot swap evolution may lead to information lost. The BPM is an event-driven stateful system, wherein business solutions are detected based on occurrences of events and the status of context instances. When a solution is forced to shutdown manually, the business situation detection that may be still in process is interrupted, which may eventually result in missing the situation. Second, the hot swap is not practical in some business scenarios. In some cases, the existing and new BPM solutions need to be running coexisting for a period of time, where the transition from the existing BPM solution to the newer one should be performed. For example, a BPM solution is developed and deployed to monitor a business process. Later on, based on the monitoring results and analysis of the BPM, the action that re-engineers business processes is taken. Therefore, the old process needs to be migrated to the new process. Accordingly, when a new BPM solution that monitors the new process is developed and deployed, the evolution of BPM solutions needs to be synchronized with business process migration. Thus, other than hot swap, transition based evolution is required.

SUMMARY OF THE INVENTION

Implementing a dynamic evolution of the BPM solution that enables continual business performance improvement is by no means a trival task. There are three major challenges:

Complexity of Mapping Relationship among Solutions. There are large numbers of business entities that need to be monitored, and these business entities may be associated with an even larger number of metrics. Further, the data structure for describing metrics may be a complex type. Therefore, when one BPM solution evolves to another, element (i.e., context, metric and situation) mapping relationship can be complicated. The challenge is to enable solution evolution without requiring much programming efforts of the solution designer.

Integrity of Event Processing and Solution of Evolution. As the target monitoring business entities (e.g., business processes) operate continually, this requires the BPM runtime engine to operate continuously. This means that the new BPM solutions need to be deployed without shutting down the BPM runtime engine (i.e., hot deployment). When one BPM lifecycle transitions to another, multiple versions of the observation models may coexist in the runtime engine. It is a big challenge for the BPM runtime engine to guarantee the integrity on both event processing (i.e., completion of ongoing event process transaction) and solution evolutions (i.e., completion of state information navigation).

Validation Runtime State Information. When migrating the state information from one BPM solution to another, state information validation is required in the target solution. For example, when a context instance migrates to a new solution, the system needs to check whether the migrated context instance is a duplication in an existing context instance in the new solution. The difficulty is that state information in both solutions is not static, as the state information is updated when event processions are still ongoing.

According to the present invention, a policy-driven approach to implement dynamic BPM solution evolutions is used. In general, a policy provides an abstraction of system behaviors that allow users to manage the system without needing to understand extraneous details. The policy-driven approach differs from existing evolutions solutions. In existing approaches, co-existing based solution transitions are not supported. Also, developers need to focus on time-consuming platform dependent implementation. In contrast, the policy-driven approach supports wide spectrums of evolution policies. Further, solution providers can concentrate on business processes and observation models, without worrying about platform specific implementation details. Therefore, BPM solutions can be continually improved by enabling another lifecycle, as the solution evolution is performed systematically through the policy-driven architecture.

Briefly stated, the salient features and contributions of the present invention are as follows:

Policy-Driven Solution Evolution. In order to capture the BPM solution evolution knowledge, we have designed an evolution policy language. The evolution policies define two aspects of a solution migration process: (i) how to sunset the existing solution transactionally; and (ii) how to migrate the elements from the existing solution to the newer one. In our solution, the evolution policies are declaratively defined by solution providers. It should be noted that there evolution policies are consumed by the runtime infrastructure to conduct the solution evolutions transparently to the users.

Hybrid Compilation-Interpretation Framework. In previous work, we proposed a hybrid compilation-interpretation framework to implement event processing, where observation models are decomposed into generic common logic, information logic and expression logic. The common logic is generic to any observation models. The information logic describes elements in an observation model. The expression logic represents the computation relationship among the elements. During the transformation, the expression logic is compiled to an executable library. In runtime, the engine that implements the common logic interprets the information and loads the library to realize the monitoring capability. The present invention follows the same design principle and benefits from such a hybrid framework but extends the runtime infrastructure to transform and interpret evolution policies, which allows fine granularity controls on solution evolution. By integrating with event process logic, the invention can guarantee controls on solution evolution and event process. Further, this framework supports execution of wide spectrums of evolution policies.

Model-driven Runtime State Validation. When migrating the data from an existing BPM solution to a new one, it is important to check whether the migrated data is valid in the new BPM solution. According to this invention, at transformation time, customized code is generated for efficient runtime state validation. Also, the relationship among the event processing progress and runtime state is determined based on the observation model. Such relationship information allows more efficient verification of freshness of migrating data and parallelization of solution evolution and event processing.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a runtime datastore data schema;

FIG. 8 is a code listing for updating metrics in the evolution of in the Business Performance Management lifecycle;

DETAILED DESCRIPTION OF A PREFERRED EMBODIMENT OF THE INVENTION

Figure 1:
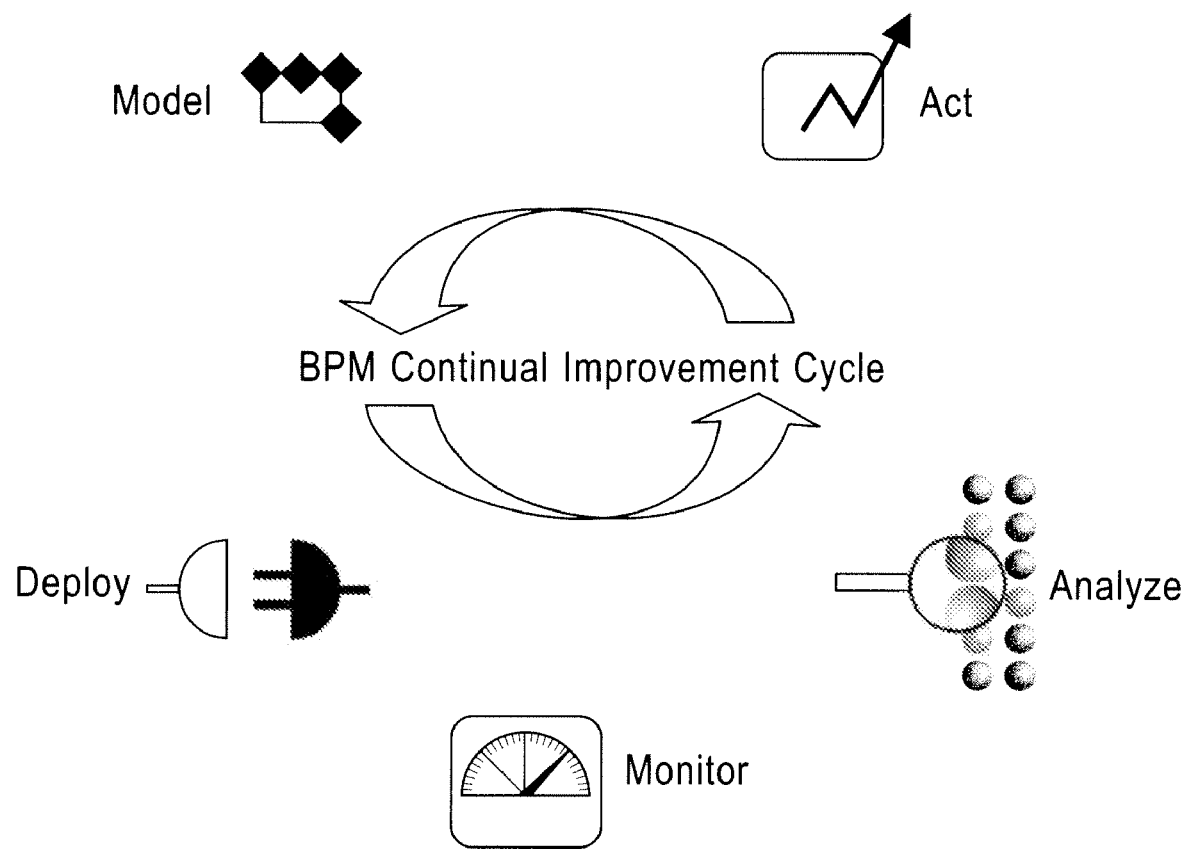
FIG. 1 is a diagram illustrating a Business Performance Management lifecycle.
Figure 2A:
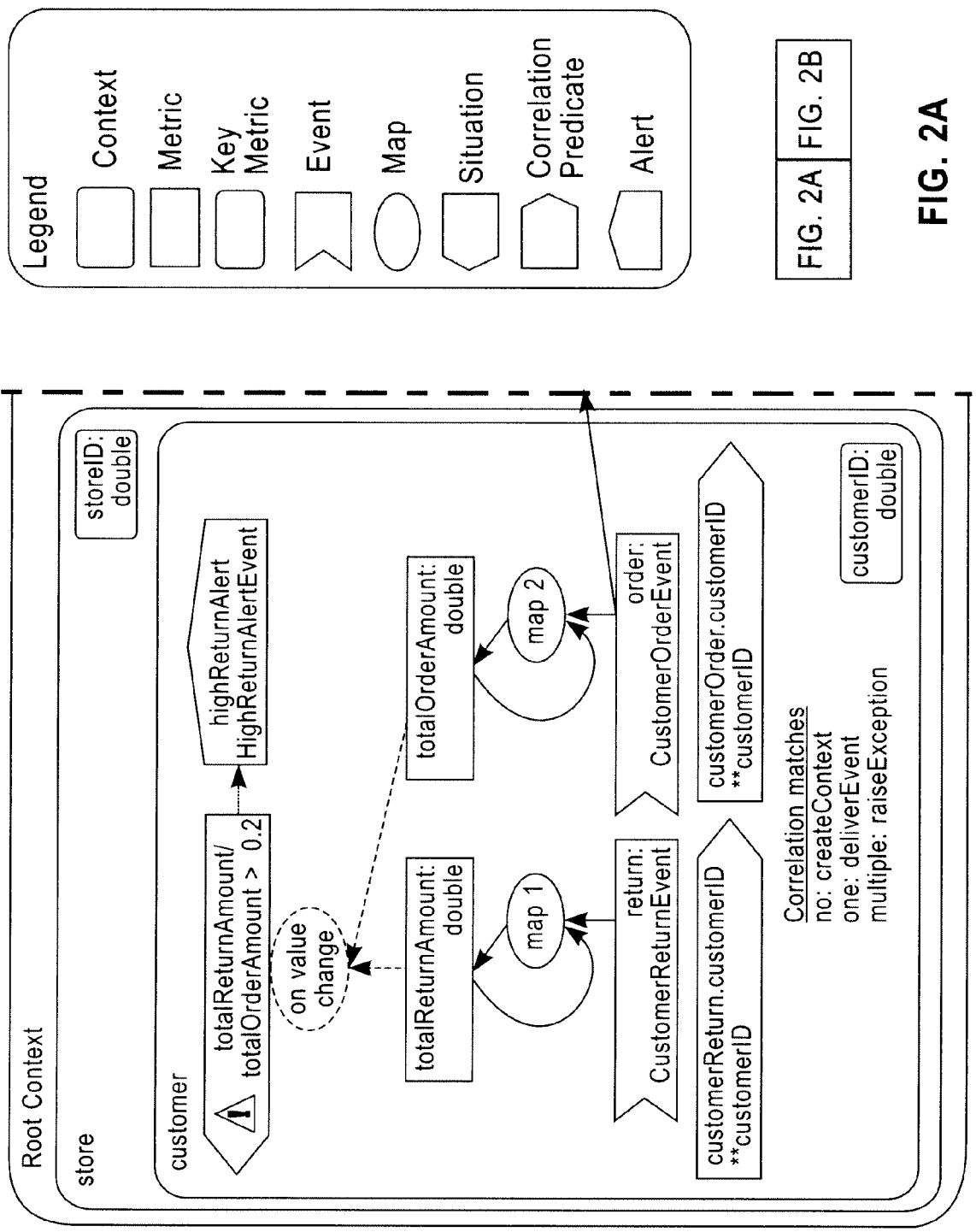
FIGS. 2A and 2B are block diagrams illustrating an example of an observation model.
Figure 2B:
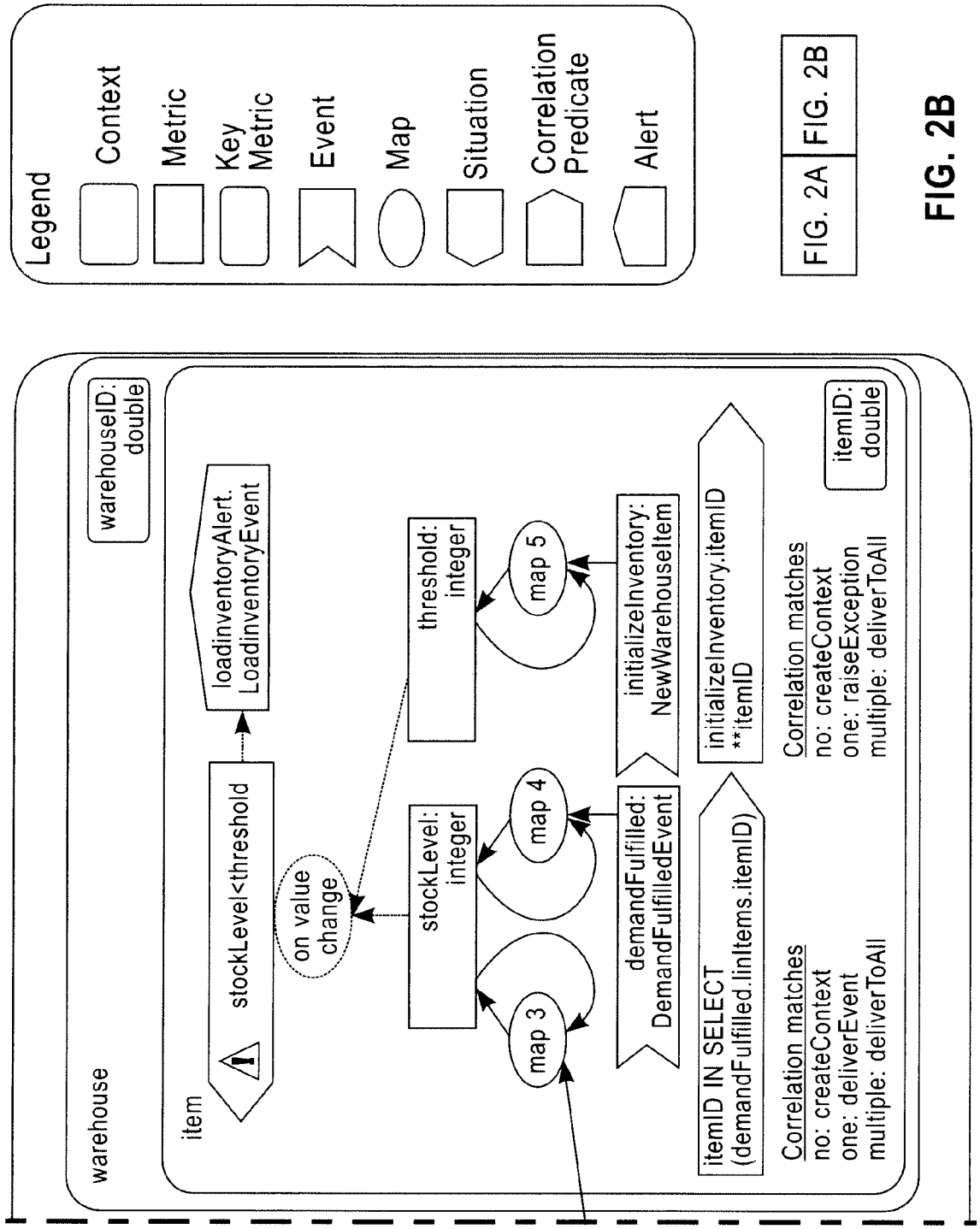

The requirements of a BPM solution are captured by an observation model. The specification of observation models is given by the observation meta-model. An example of an observation model is shown in FIG. 2 to illustrate the design of the observation meta-model. The meta-model describes two aspects of an observation model.

Figure 3:
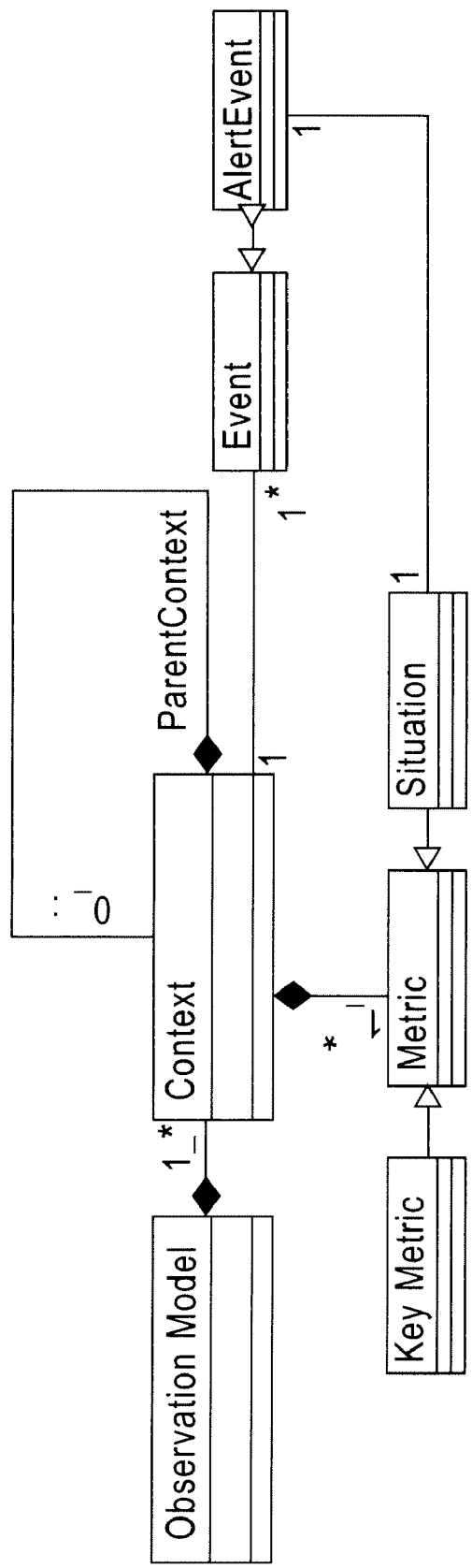
FIG. 3 is a block diagram of the information organization in the observation model.

The information in an observation model is typically constructed top-down. Formally, an observation model, as illustrated in FIG. 3, contains a hierarchy of contexts. For example, in FIG. 2, the root context contains two contexts store and warehouse, and context store further contains context customer. A context corresponds to an entity to be monitored. There are two kinds of context: statically defined (for example, warehouse) or dynamically created (for example, items in a warehouse). From an information organization point of view, context can be considered as a container for metrics. Metrics are the knowledge about business operation performance of the entity being observed. As an example, a metric can be the stockLevel of an item in warehouse. More specifically, a key metric is used to identify a context instance. For example, store ID is the key metric that is used to identify context store. Situations are a Boolean type of metrics and represent the gating conditions for generating alters. A context associates with a collection of events. Events report up-to-date status information about business operations, which are used to compute the value of metrics. It should be noted that the data structure for defining metrics and events can be primitive, structured, and single or multiple value type.

Figure 4:
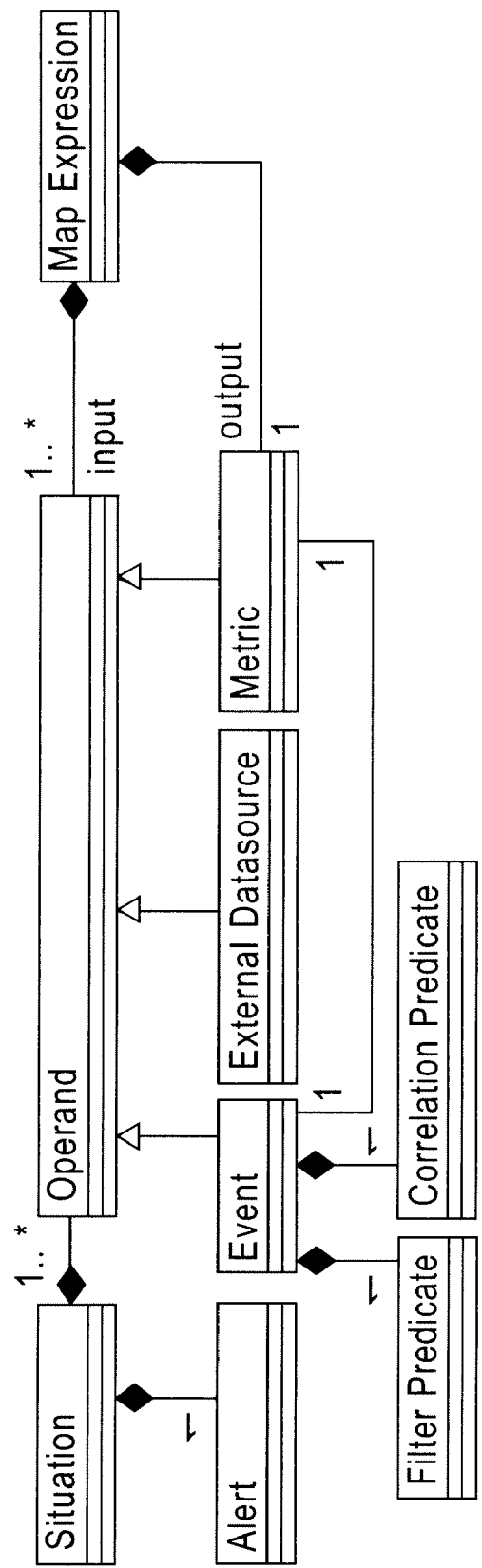
FIG. 4 is a block diagram illustrating the operation of the observation model.

There are two aspects regarding the operation of an observation model, as illustrated in FIG. 4: (1) How the events are being processed, and (2) the metric network. An event is associated with a filter predicate and a correlation predicate. The filter predicates specify the types of events that need to be processed. Correlation predicates determine the associations between events and context instances. At runtime, an event is either correlated into existing context instances, creates a new context instance or raises an exception. It should be noted that a metric in the context is used to save the value of an event. As to the metric network, we adopt a graphical model that captures the dependency relationships among metrics. The vertices represent either metrics or dependencies among metrics. The edges represent the relationship between a dependency and a metric; either inputslot or outputslot. Map expressions are used to denote the association between a dependency vertex and input/output metrics. As an example, in FIG. 2, the map expression (map 3) is shown as:

item.stockLevel:=minus(item.stockLevel, customer.order.lineItem.amount)

In this expression, minus is a dependency vertex, and item.stockLevel and customer.order.lineItem.amount are metric vertices. The item.stockLevel and customer.order.lineItem.amount are inputslots and item.stockLevel is an outputslot of dependency minus. The metrics in a map expression may belong to different contexts. For example, in the above expression, two metrics are from context item and customer, respectively. The relationship supported by a metric network includes functional, probabilistic, system dynamics and extensible user-defined dependency. We focus here on explicit functional dependency. It should be noted that the execution of an expression can be triggered by an incoming event, value changes of a metric, or occurrence of a situation.

In order to realize the BPM evolution, we extend the observation meta-model with Evolution Policy to describe the process of BPM solution evolution. There are two aspects in the evolution process: (1) How to pase out the existing model transactionally (sunset policy); and (2) how to migrate context instances and associated elements (i.e., metrics and situations) from the existing version to the newer one (context mapping policy).

A collection of sunset policies define the process of phasing out a BPM solution, where a policy is denoted as T[P]|A. T indicates type of contexts or events in the observation model. P is a predicate for selecting either context or event instances. A is the action for managing the selected instances. There are two kinds of policies, according to contexts and events in the observation model for the existing BPM solution.

1. Context instance termination policy. Each type of context in the observation model is associated with a collection of context instance evolution policies. There are three different actions in this type of policy:

Terminate immediately: This action forces the selected context instances to be discarded immediately. An example of termination policy can be Item:: item [item.stockLevel=0]| terminate (item, timestamp), which means for monitor context instance item (the context type is Item), if its metric stockLevel's value equals to zero, then terminate context instance item by timestamp.

Keep alive: This action indicates that the selected context instances are continued until terminated by the termination situation that originally defined the observation model. An example of keep alive policy can be Item:: itme[item.stocklevel>0]|keepAlive (item), which means for monitor context instance item (the context type is Item), if its metric stockLevel's value is greater than zero, then keep alive context instance item.

2. Event handling policy. Each type of event in the observation model is associated with a collection of event handling policies. There are also three type of actions for the events:

Ignore: This action indicates the event selected by the predicate is ignored.

Correlate with existing context instances only: This action indicates that the selected events only correlate with existing context instances only, but not creating any new context instances.

Correlate with existing context instance or create new context instances: This action indicates that selected events are used to correlate with existing context or create new context instances.

An example of event policy can be CustomerOrderEvent:: customerOrder[ ]|ignore (customerOrder), which indicates that all the customerOrder events will be ignored.

Context migration policy defines how context instances are migrated to the newer solution, which can be notated as: Cs[P]|Ct(E), where Cs is the source context in the existing BPM solution, P is a predicate for selecting context instances, Ct is the target context type that selected context instances migrated to, and E is a list of expressions that define element mapping relationship between the source and the target context. In general, an expression can be denoted as:

$$V'.C.\lambda := \chi(V.C_1, \lambda_1, V.C_2.\lambda_2, \ldots, V.C_n.\lambda_n, V.\gamma_1, V.\gamma_2, \ldots, V.\gamma_m, V.\epsilon_1, V.\epsilon_2, \ldots, V.\epsilon_k) \quad (1)$$

where $\chi$ is the operator and there are three kinds of operands: metrics ($\lambda_i$), events ($\gamma_i$) and external data sources ($\epsilon_i$).

An example of migration policy can be V. Customer:: customer[customer.totalReturnAmount>0]|V'.Customer (V'.Customer.customerID:=V.Customer.customerID; V'.Customer.totalReturnAmount:=V.Customer.totalReturnAmount), which means for monitor context instance customer (the context type is Customer), if its metric totalReturnAmount's value is greater than zero, then migrate this context instance customer to version V2's monitor context Customer. Actually, from the new solution perspective, migrating context instance from the existing solution can be considered as creating a new context instance4. Therefore, each key metric much have one element mapping policy to set the value. Other than key metrics, non-key metric mapping policies may also be required for BPM solution evolution. It should be noted that if V'C.$\lambda$ is a key metric in the new solution, then all the operands must be static (i.e., the values are not updated after the value is assigned).

There are some constraints when migrating the context instance from the existing BPM solution to the new one. First, if the context instances are direct descendants of the root context in the existing BPM solution, then the context that migrated to the new BPM solution should also be the direct descendent of the root context. Second, if both context instances and the context that migrated to the new BPM solution are not direct descendents of the root context, then the context instances' parent context should be also migrated. Further assume that context $V.C_1$ maps to context $V'.C'_1$, if context $V.C_1$'s parent context of $V.C_2$ maps to $V'.C'_2$, then $V'.C'_1$'s parent context is $V'.C'_2$ in the new BPM solution V'.

Figure 5:
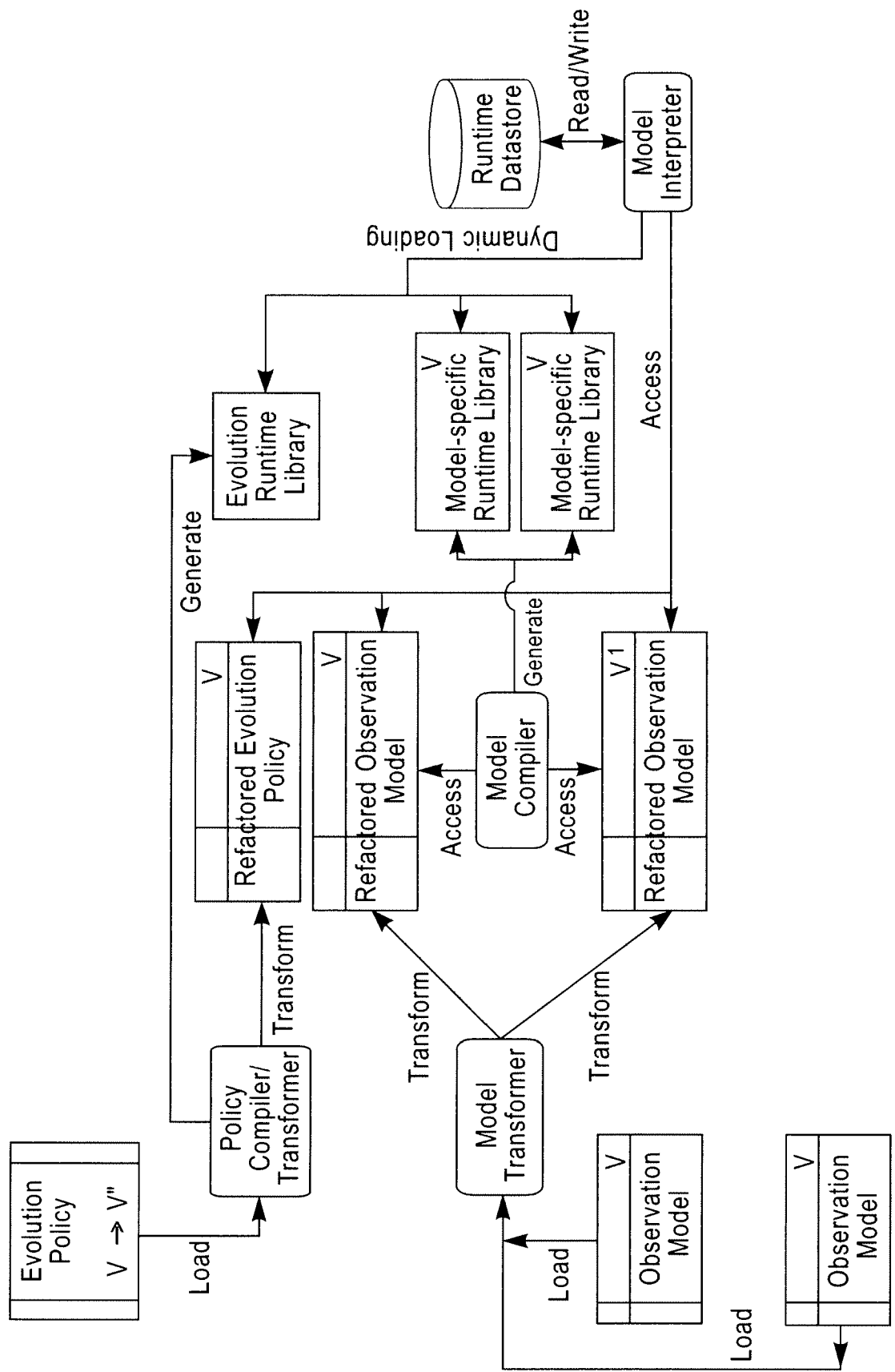
FIG. 5 is a block diagram illustrating the hybrid approach for observation model execution and solution evolution.

In our earlier work, we adopted a compiling and interpreting hybrid approach to realize the execution of observation models. We distinguished three kinds of application logic in a BPM solution: common logic, information logic and model specific logic. The common logic is defined in meta-model level, which is applied to any observation model. One example of common logic is the routine for processing events. The information logic includes information organization in the observation model. Model specific logic (e.g., map expression) is unique to each individual model. Our solution consists of three components, namely model transformer, model compiler and model interpreter, as illustrated in FIG. 5. At build time, the model transformer decomposes the observation model into information logic and model specific logic. Also, it transforms the context-oriented model into an event-oriented model, which allows a more efficient runtime access to the model information. The compiler generates the object code for the model specific logic. It should be noted that in our preferred embodiment, we adopted J2EE as our runtime platform. The object code of our model compiler is Java source code, which will be further compiled into Java library for runtime execution. Finally, the interpreter implements the common logic and interprets the information logic. It dynamically loads the model specific Java library to realize the operation of the observation model. Such an approach takes advantage of both compiling and interpreting. By adopting a compiling approach, execution performance is improved by generating customized code for individual models, while by interpreting a model makes it easy to realize the model evolution because the interpreter maintains all the model information.

If evolution policies are considered as a declarative program, like the observation model, there are also two approaches to executing a program; namely, interpreting and compiling. The advantage of interpreting policies is that it is easy to realize the evolution policy execution because the policy interpreter can be easily integrated with the BPM runtime engine as the runtime engine maintains all the model information. However, the logic of selection context instances and mapping expression can be very complicated. Therefore, developing an interpreter that can execute map expressions optimally becomes difficult, given that the operators in constructing map expression can be rational, set, vector, scalar, etc. Further, the elements referenced in mapping expressions are not limited to the same context. To locate the operands in mapping expressions, the interpreter needs to navigate through the hierarchy of contexts at runtime, which may also incur performance penalties. Such performance penalties may greatly impact the on-going situation detections.

Adopting a compiling approach can improve evolution execution performance by generating customized code for individual expressions; however, generated code is a stand alone component, which is impractical to integrated with the BPM runtime engine. Such an approach can support hot swapped-based evolution; however, it fails to support transition-based evolution. For example, in a transition-based evolution, some context instances need to phase out transactionally. Without integrating with the observation runtime engine, context instances may be terminated when the situation detection is still in progress.

In order to take advantage of the hybrid framework of FIG. 5, we also compile and interpret evolution policies. In the present invention, the policy transfer transforms evolution policies and stores data in refactored evolution policies, and the policy compiler generates the runtime library for context instance selection predicate and mapping expressions. The model interpreter is also extended in the runtime engine to consume information in refactored evolution policies and dynamically loading the evolution library for solution evolution.

Figure 6:
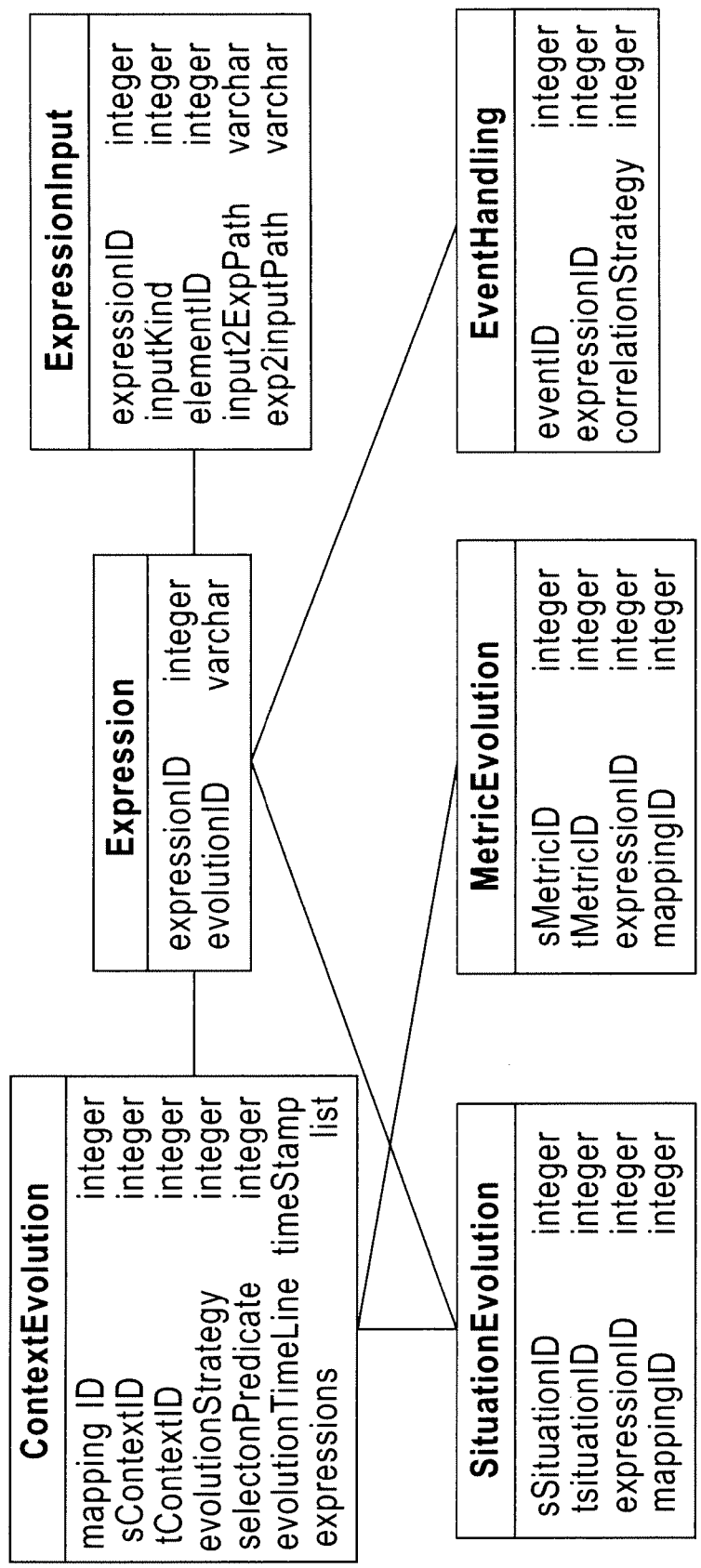
FIG. 6 is a simplified data schema for evolution policy.

One of the key steps in the policy-driven approach according to the present invention is to transform policies. Further, in order to facilitate compilation, the policy transformer pre-processes mapping expressions. As discussed earlier, the design of the evolution policy language aims to facilitate the creation of policies. However, the organization of the data is not suitable for efficient runtime access. We designed the policy transformer that reorganizes the policies information according to the schema shown in FIG. 6. In this data schema, a table is created for each type of element in evolution policy, including ContextEvolution for sunset policies, MetricEvolution and SituationEvolution for element mapping policies. Primary and foreign keys are used to represent the cross reference among the elements. For example, by foreign key mappingID in table MetricEvolution, the metric evolutions that are belonging to a context evolution can be located.

Other than re-organizing information in evolution policies, the policy transformer also pre-processes policies. In particular, it collects mapping expressions that should be executed during the context evolutions and the result is stored in the field of expressions in table ContextEvolution. Further, the policy transformer also pre-processes mapping expressions by determination of the navigation paths for each operand.

In the framework of the present invention, context migration consists of two basic steps: (1) migrating the context instances and their key values; and (2) migrating the non-key metrics. Accordingly, there are two aspects of runtime state validation: (1) a context instance duplication test; and (2) validating freshness of operands in non-key metric mapping policies.

As discussed earlier, mapping a context instance from one BPM solution to a new one can be considered as creating a new context instance in the new solution. Therefore, a context instance duplication test is required. In the present invention, customized code is generated to facilitate the efficient runtime state validation. Before getting into the details about code generation, we first briefly describe the design of runtime data store schema which the generated code runs on. The unified data schema is shown in FIG. 7. This data schema can be used by any observation model. To improve performance, our data schema stores the runtime objects vertically which minimizes the read/write conflicts. There are four tables in the schema. One table, ContextInstances (C), is used to store the context instances, while another table, Values (V), is used to store the data of contexts. It should be noted that the content of the contexts are stored vertically in table Values. In table Values, each elementary element in contexts has a record in the table and contextInstanceID is unique for each context instance. Using contextInstanceID, the records in the table can be correlated to individual context instances. Table Dimensions (D) is used to store the dimension information when there exists array type of data elements in contexts. By specifying dimensionOrder and sequenceID, the data store can store any dimension array of data in a context. Further, the table Types (T) gives type information.

Given the above unified datastore, we present how to generate queries to perform a duplication test. Assuming the target context instance's type is $\mu$. The goal is try to search for the context instance that has same key metric values as created from the key-metric mapping expression. The first step is generating queries to retrieve the context instances that belong to the migrating context type.

$$\rho(p, \pi_{instanceID}(C_{contextID=\mu})) \qquad (2)$$

In the next step, we illustrate how to retrieve its key metric value, assuming there is a list of key metrics $(\lambda_1, \lambda_2, \ldots, \lambda_k)$ for the monitor context and each metric has a list of attributes $(\alpha_1, \alpha_2, \ldots, \alpha_n)$. If the $\alpha_j$'s data type is string, then the query generated for retrieving $\lambda_i$'s $\alpha_j$ is:

$$\rho(v_{i,j}, \pi_{stringValue,positionID}(\sigma_{V.itemName=\lambda_i \cdot \alpha_j}(V \bowtie_{instanceID} P))) \qquad (3)$$

This query joins the table Values with context instances that have the same context type as the migrated instance. Also assuming attribute $\alpha_j$ has l dimensions and the size of each dimension is $d_k(1<k<l)$, the extra queries about the dimension $[x_1, x_2, \ldots, x_l]$ $(0<x_k<d_k)$ is generated as:

$$\rho(d_{i,j,k}, (\sigma_{D.dimensionOrder=k \cdot D.sequenceID=x_k}D))k \in [1 \ldots l] \qquad (4)$$

For example, if $\alpha_j$'s dimension number is 2 and the dimension that needs to be retrieved is [3,5], then two queries are generated as it is a two dimensional expression:

$$\rho(d_{i,j,1}, (\sigma_{D.dimensionOrder=1 \cdot D.sequenceID=3}D))$$

and $$\rho(d_{i,j,2}, (\sigma_{D.dimensionOrder=2 \cdot D.sequenceID=5}D))$$

It should be noted that each above query is according to a dimension of the attribute of key metric, which selects the tuple in table dimensions. Using the above example, by equijoining $d_{i,j,1}$ and $d_{i,j,2}$, we can have $$\rho(d_{i,j}[\chi_1, \chi_2, \ldots, \chi_l] \bowtie_{positionID} \{d_{i,j,k}, k \in [1 \ldots l]\}) \qquad (5)$$

In the next step, by equijoining $v_{ij}$ with $d_{ij}$ using dimenionsID to search the fields, we have a query:

$$\rho(v_{i,j}'[\chi_1,\chi_2,\ldots,\chi_l],(v_{i,j}\bowtie_{positionID} d_{i,j}[\chi_1,\chi_2,\ldots,\chi_l])) \quad (6)$$

where $v'_{i,j}[x1, x2, \ldots, xl]$ represents the value of a key metric's attribute value in position $[x1, x2, \ldots, xl]$. Assuming the key-metric value in position $[x1, x2, \ldots, xl]$ that computed from mapping expression is $\lambda[x1, x2, \ldots, xl]$. The query for testing whether these two values are equal is:

$$\rho(c_{i,j}[\chi_1,\chi_2,\ldots,\chi_l],\pi_{instanceID}$$
$$(v_{i,j}'[\chi_1,\chi_2,\ldots,\chi_l]_{stringValue=\lambda[\chi_1,\chi_2,\ldots,\chi_l]})) \quad (7)$$

Therefore, by equijoining the instanceID for every position of every attribute in every key metric, we have the following query to test whether the context instance exists in the target solution.

$$\rho(c,\pi_{instanceID}(\bowtie_{instanceID}\{c_{i,j}[\chi_1,\chi_2,\ldots,\chi_l]\}),$$
$$i \in [1\ldots m], j \in [1\ldots n], \chi_k \in [0\ldots d_k), k \in [1\ldots l] \quad (8)$$

In the runtime, generated queries are executed when the execution of all the key metric mapping policies are completed, in order to check whether a new context instance needs to be created on the target BPM solution.

In the second step of migrating context instance, non-key metric mapping policies are executed. The operands may be updated in the on going process (i.e., the existing BPM solution); that is, in parallel with the migration process. If that is the case, then the metric value that was computed based on the mapping expression in the migrated context instance is out of date. In such a situation, the execution of executing the non-key metrics mapping policies need to wait until the event processing is completed.

In order to efficiently determine the freshness of operand values in mapping policies, we analyze the observation model of the existing BPM solution to determine the metrics or situations that may be updated during the processing of the event (See Algorithm 1). The basic idea of the algorithm is to use the event as a trigger to initiate the expression computation (line 8) and then recursively use the output of expression to trigger other expressions (line 23). It should be noted that triggering a map computation can be either an event (line 10) or value change of a metric (line 14) or occurrence of a situation (line 18). By accumulating the output of the triggering expression (line 21), the list of elements that maybe updated during the processing of the event is obtained.

At runtime, each context instance keeps a list of events (i.e., Event [ ] currentProcessingEvents) that are being processed. When executing the non-key metric mapping policy, if an operand's hosting context instance's currentProcessingEvents is not empty and the operand is in updateMetrics ( ) of any event in currentProcessingEvents, then the execution of the policy needs to be paused until the event processing is completed. At the same time, the runtime engine also queues events that may update the metric value until the execution of mapping policy is completed (in both existing and new BPM solutions). Therefore, we can not only guarantee the freshness of the metric value, but also the completeness of the event processing.

Figure 9:
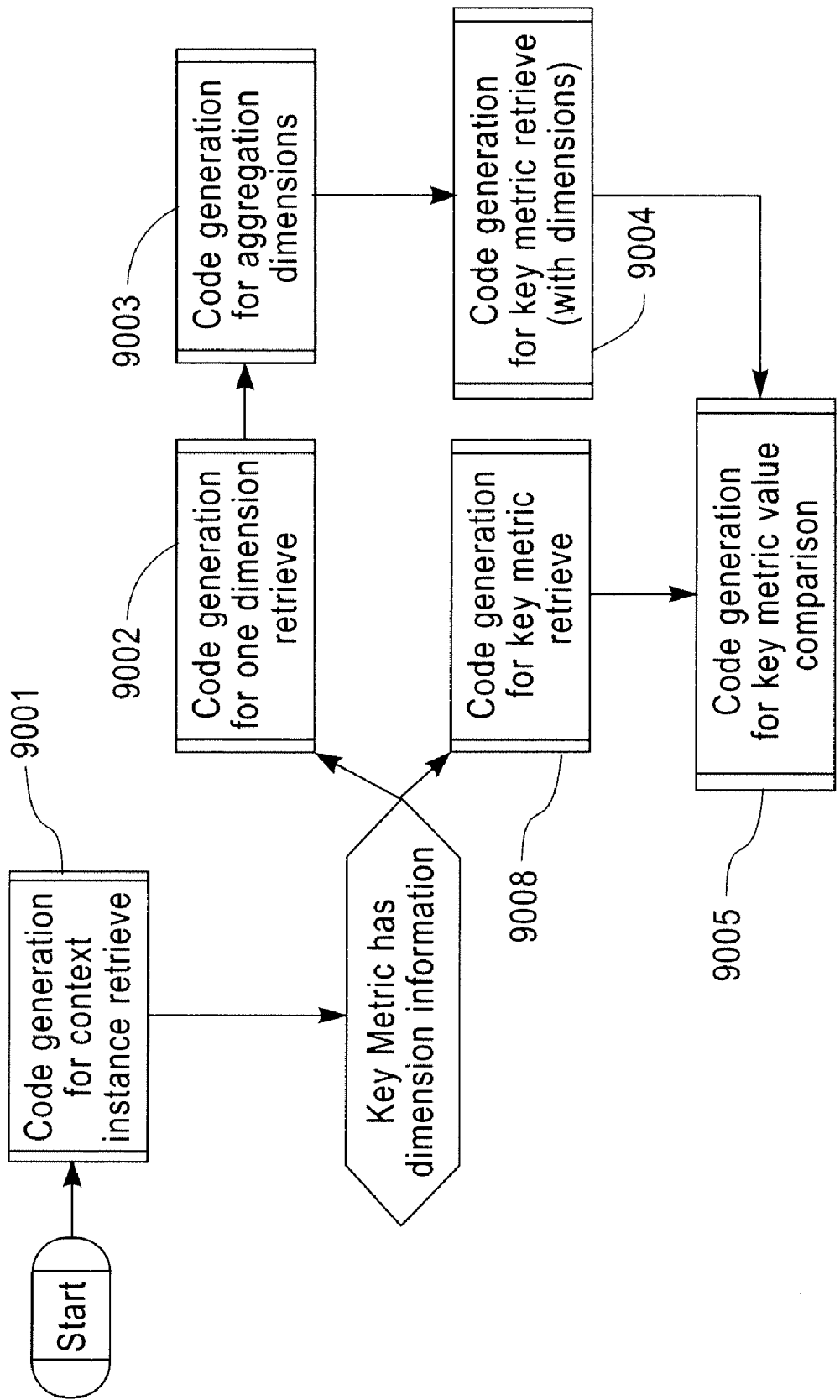
FIG. 9 is a flow diagram for generating code to detect duplicate context instance.

FIG. 9 is a flow diagram illustrating the logic for generating code for detecting context instances. The process starts with code generation for context instance retrieve in step 9001. Then, based on whether there is dimension information in the key metric, code generation is conducted for one dimension retrieve in step 9002 or conducting code generation for key metric retrieve in step 9006. In step 9003, code generation is conducted for aggregation dimensions. Therefore, in step 9004, cod generation is performed for retrieving the key metric values. Finally, in step 9005, code for key metric value comparison is generated in order to detect duplicate context instances.

According to the invention, in order to transactionally shutdown the existing BPM solution, executing sunset policies and event processing are integrated into the model interpreter. The model interpreter loads and executes the runtime classes that are generated from context instance selection predicates in the sunset policy. The selected context instances are terminated according to the time stamp given by the policy. Execution of event handling policies is integrated with the event correlation process. When a new event is received, the model interpreter loads and executes the runtime classes that were generated from context instance selection predicates to determine whether to ignore or correlate to the existing context instance or create a new context instance.

Figure 10:
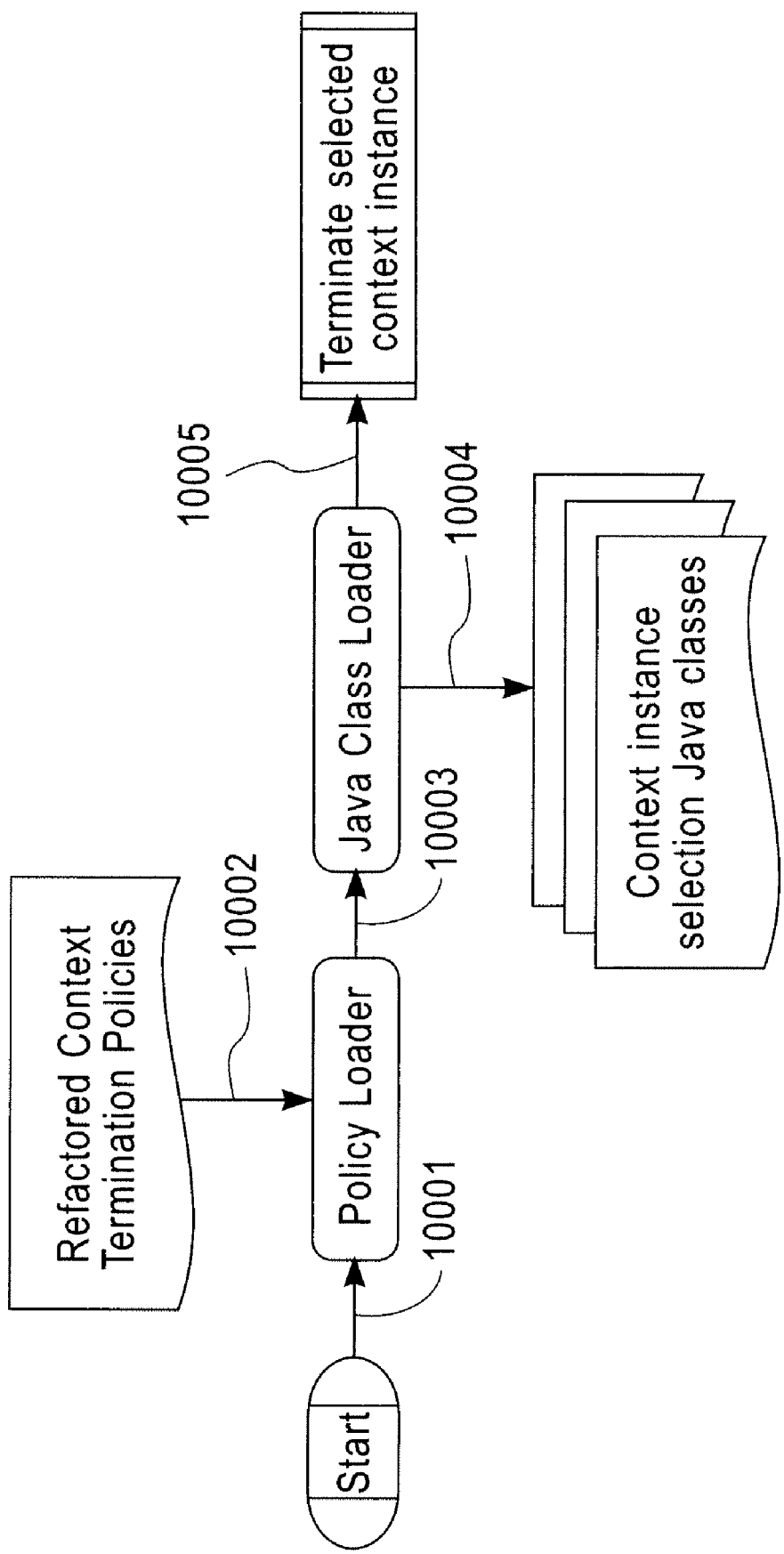
FIG. 10 is a flow diagram for execution of termination policies.

FIG. 10 is a flow diagram illustrating the logic of the execution of context termination policies. The process starts with the policy loader that loads refactored sunset policies in step 10002. Then, the Java class loader is notified in step 10003 to load the context instance selection Java class in step 10004. And finally, in step 20005, selected context instances are terminated.

In the execution of context migration policy, the model interpreter loads and executes the runtime classes that are generated from context instance selection predicates in the migration policies. For the selected context instance, the model interpreter executes the key-metric mapping expression to compute the key metric value. Then it executes the generated code for the duplication test. If a duplicated instance is found, the found context instance is then the target instance for non-key metric migration. If the migrated instance is not a duplication, a new context instance is created in the target solution using the key metric values, and then non-key metric migration is performed.

Figure 11:
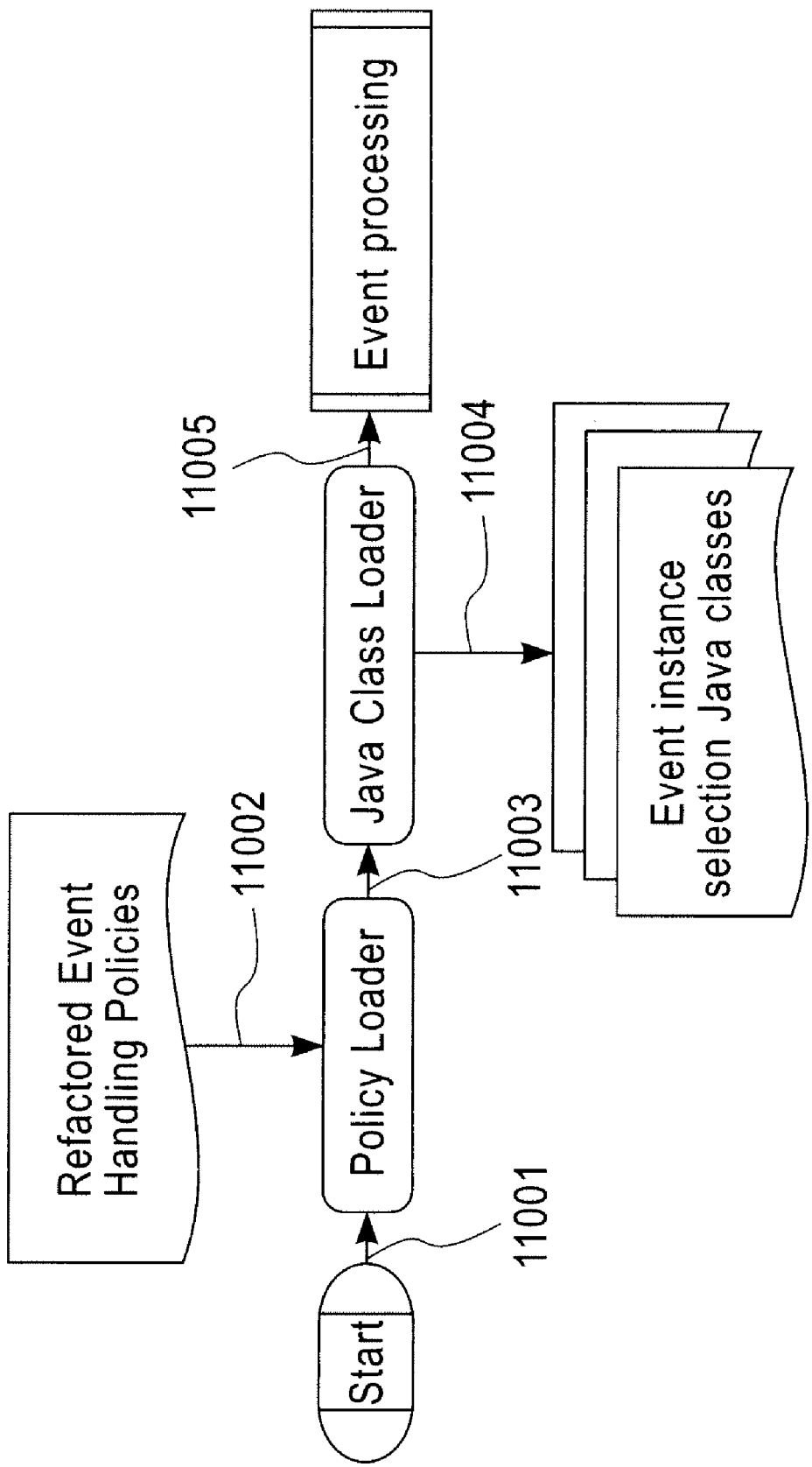
FIG. 11 is a flow diagram for the execution of event handling policies.

FIG. 11 is a flow diagram which illustrates the logic of the execution of event handling policies. The process starts with the policy loader that loads, in step 11002, refactored event handling policies. Then, in step 11003, the Java class loader is notified to load the event instance selection Java classes in step 11004. And finally, in step 11005, selected event instances are processed.

Figure 12:
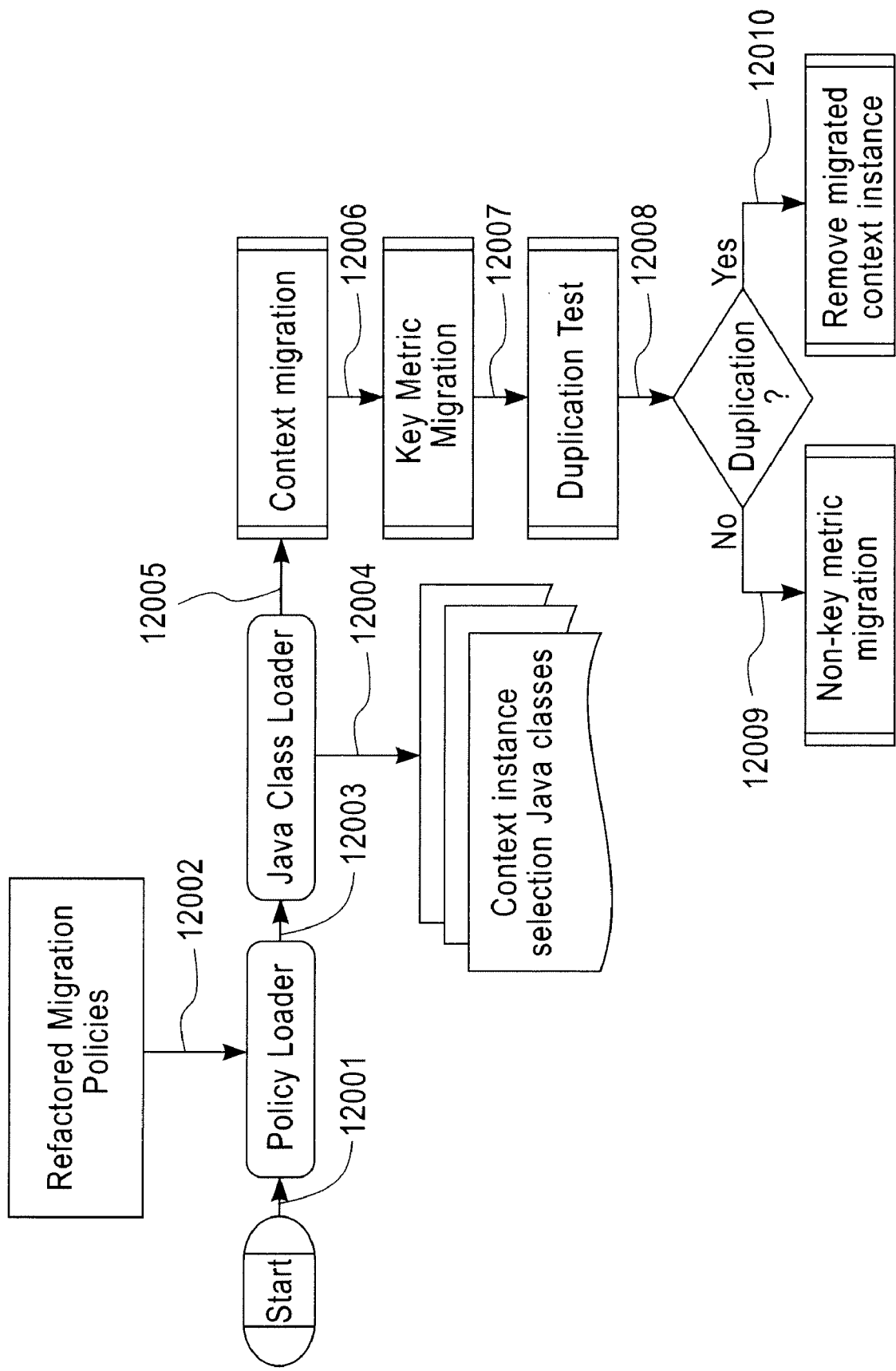
FIG. 12 is a flow diagram for the execution of context migration policies.

FIG. 12 is a flow diagram that illustrates the execution of context migration policies. The process starts with the policy loader loading in step 12002 refactored migration policies. Then, in step 12003, the Java class loader is notified to load the context instance selection Java classes in step 12004. And then, in step 12005, selected context instances are migrated. When context instances are migrated, the key metrics are also migrated in step 12006. Then, a context instance duplication detection is performed in step 12007. if migrated context instances are not duplications of existing context instances, migration of the non-key metric is performed in step 12009; otherwise, the migrated context instances are removed in step 12010.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of dynamic evolution in business performance management (BPM) comprising the steps performed by a computer of:

storing a collection of declarative evolution policies wherein each evolution policy is for evolution of a BPM solution from an existing BPM solution to a new BPM solution, wherein a BPM solution:

processes business events, computes business metrics, detects business situations and provides real-time visibility of Key Performance Indicators (KPIs), has a lifecycle of (1) a modeling phase followed by (2) a deployment phase followed by (3) a next phase of monitoring business activities followed by (4) a phase of performing further analysis followed by (5) a final phase of taking action for improving business performance, and comprises (1) common logic that is defined in meta-model level, (2) information logic and (3) model-specific logic, and the evolution policies define (i) how to sunset the existing BPM solution transactionally; and (ii) how to migrate elements from the existing BPM solution to the new BPM solution;

migrating the business performance management solutions based on the evolution policies, wherein the migrating step is performed by a runtime engine executing on the computer, including performing dynamic and transition-based evolution from the existing BPM solution to the new BPM solution, without the existing BPM solution having been hot swapped to the new BPM solution and without having forced, when the new BPM solution is deployed, the existing BPM solution to shutdown, and running the existing BPM solution and the new BPM solution coexisting for a period of time.

2. The computer implemented method of dynamic evolution in business performance management recited in claim 1, including:

phasing out an existing solution transactionally by applying defined sunset policies; and performing the migrating step by applying defined context migration policies.

3. The computer implemented method of describing business performance management solution evolution recited in claim 2, wherein the step of phasing out the existing solution transactionally by applying defined sunset policies includes application of defined context instance termination policies and defined event handling policies.

4. The method of dynamic evolution in business performance management recited in claim 1, wherein a compiler is used to generate the evolution runtime library for evolution policies and the generating step comprises: generating code for retrieval of a value of each operand; generating code for executing an operator; and generating code for assigning the value to a metric.

5. The method of dynamic evolution in business performance management recited in claim 1, wherein the migrating step comprises:

loading the generated runtime library based on refactored evolution policy information;

conducting runtime state validation; and executing the runtime library to migrate a business performance management solution.

6. The method of claim 1, including phasing out of an existing business process phase and migrating to a newer or next business process phase without loss of critical data or metrics.

7. The method of claim 1, including context migration in which are performed steps of:

migrating a set of context instances and key values of the context instances; and migrating a set of non-key metrics.

8. The method of claim 7, including runtime state validation in which are performed: a context instance duplication test; and validating freshness of a set of operands in non-key metric mapping policies.

9. The method of claim 1, including refactoring the evolution policies.

10. The method of claim 1, including generating an evolution runtime library for the evolution policies.

* * * * *